(12) United States Patent
Wang et al.

(10) Patent No.: US 10,997,390 B2
(45) Date of Patent: May 4, 2021

(54) FINGERPRINT SENSING DEVICE AND FINGERPRINT SENSING METHOD

(71) Applicant: Guangzhou Tyrafos Semiconductor Technologies Co., LTD, Guangzhou (CN)

(72) Inventors: Jia-Shyang Wang, Miaoli County (TW); Ping-Hung Yin, Taipei (TW)

(73) Assignee: Guangzhou Tyrafos Semiconductor Technologies Co., LTD, Guangzhou (CN)

( * ) Notice: Subject to any disclaimer, the term of this patent is extended or adjusted under 35 U.S.C. 154(b) by 78 days.

(21) Appl. No.: 16/544,937

(22) Filed: Aug. 20, 2019

(65) Prior Publication Data

US 2020/0065552 A1   Feb. 27, 2020

Related U.S. Application Data

(60) Provisional application No. 62/721,553, filed on Aug. 22, 2018.

(51) Int. Cl.
  *G06K 9/28*   (2006.01)
  *G06K 9/00*   (2006.01)
  *G06K 9/03*   (2006.01)
  *G06K 9/20*   (2006.01)

(52) U.S. Cl.
  CPC ......... *G06K 9/00053* (2013.01); *G06K 9/036* (2013.01); *G06K 9/2027* (2013.01)

(58) Field of Classification Search
  CPC ............ G06K 9/0004; G06K 9/00006–9/0012
  See application file for complete search history.

(56) References Cited

U.S. PATENT DOCUMENTS

2016/0034772 A1   2/2016 Betensky et al.
2016/0266695 A1*  9/2016 Bae ................... G06F 3/04166

FOREIGN PATENT DOCUMENTS

CN   105893992   8/2016
CN   107004130   8/2017
TW   M557387    3/2018

OTHER PUBLICATIONS

"Office Action of Taiwan Counterpart Application," dated Dec. 12, 2019, p. 1-p. 7.

* cited by examiner

*Primary Examiner* — Brian Werner
(74) *Attorney, Agent, or Firm* — JCIPRNET

(57) ABSTRACT

A fingerprint sensing device and a fingerprint sensing method are provided. The fingerprint sensing device includes a transparent panel, an illumination source, a fingerprint sensor, and a processor. The illumination source is configured to sequentially provide a plurality of illuminating patterns during one exposure period to sequentially illuminate a finger object placed on the transparent panel. The fingerprint sensor includes a plurality of image sensing units. The image sensing units sense the finger object illuminated by the illuminating patterns provided by the illumination source during the one exposure period to output a plurality of pixel data. The processor is configured to receive the pixel data to generate a fingerprint image according to the pixel data. Each of the illuminating patterns includes a plurality of bright regions and a plurality of dark regions arranged in sequence, and the bright regions and the dark regions are dynamically displaced in the illuminating patterns.

12 Claims, 4 Drawing Sheets

FINGERPRINT SENSING DEVICE AND FINGERPRINT SENSING METHOD

CROSS-REFERENCE TO RELATED APPLICATION

This application claims the priority benefit of U.S. provisional application Ser. No. 62/721,553, filed on Aug. 22, 2018. The entirety of the above-mentioned patent application is hereby incorporated by reference herein and made a part of this specification.

BACKGROUND OF THE INVENTION

1. Field of the Invention

The present invention relates to a sensing technology, and in particular, to a fingerprint sensing device and a fingerprint sensing method.

2. Description of Related Art

With the evolution of a fingerprint sensing technology, under-screen fingerprint sensing is one of the important development directions of the current fingerprint sensing technology. The under-screen fingerprint sensing may adopt an optical under-screen fingerprint sensing architecture or an ultrasonic under-screen fingerprint sensing architecture, where the optical under-screen fingerprint sensing architecture is widely used in various electronic products at present. In general, the optical under-screen fingerprint sensing architecture may include a screen protection panel, a glass panel, an illumination source, and a fingerprint sensor. Illumination light is provided by the illumination source to a finger object pressed on the screen protection panel, and then image light with fingerprint information is reflected to the fingerprint sensor via the screen protection panel and the finger object.

However, in a general optical under-screen fingerprint sensing architecture, since the illumination light is transmitted via the illumination source, it will be transmitted to the screen protection panel via the glass panel. Therefore, the glass panel may reflect part of the illumination light to the fingerprint sensor to form noise light without fingerprint information. Therefore, in the general optical under-screen fingerprint sensing architecture, the fingerprint sensor easily receives a fingerprint image with a low signal to noise ratio (S/N Ratio), resulting in poor fingerprint recognition efficiency. Therefore, the solutions of how to effectively improve the signal to noise ratio of a fingerprint image obtained by an optical under-screen fingerprint sensing architecture will be presented below in several embodiments.

SUMMARY OF THE INVENTION

The present invention provides a fingerprint sensing device and a fingerprint sensing method, which can generate a fingerprint image with a high signal to noise ratio (S/N Ratio).

The fingerprint sensing device of the present invention includes a transparent panel, an illumination source, a fingerprint sensor, and a processor. The illumination source is configured to sequentially provide a plurality of illuminating patterns during one exposure period to sequentially illuminate a finger object placed on the transparent panel. The fingerprint sensor includes a plurality of image sensing units. The plurality of image sensing units sense the finger object illuminated by the plurality of illuminating patterns provided by the illumination source during the one exposure period to output a plurality of pixel data. The processor is coupled to the illumination source and the fingerprint sensor, and configured to receive the plurality of pixel data to generate a fingerprint image according to the plurality of pixel data. Each of the plurality of illuminating patterns includes a plurality of bright regions and a plurality of dark regions arranged in sequence, and the plurality of bright regions and the plurality of dark regions are dynamically displaced in the plurality of illuminating patterns.

In an embodiment of the present invention, each of the plurality of pixel data includes a fingerprint information parameter and a noise parameter. The fingerprint information parameter is a sum of a plurality of sub-fingerprint parameters. The noise parameter is a sum of sub-noise parameters. The number of the plurality of sub-fingerprint parameters and the number of the plurality of sub-noise parameters are equal to the number of the plurality of illuminating patterns.

In an embodiment of the present invention, a value of one of the plurality of sub-noise parameters is higher than a value of one of the plurality of corresponding sub-fingerprint parameters, and values of the plurality of other sub-noise parameters are respectively lower than values of the plurality of other corresponding sub-fingerprint parameters.

In an embodiment of the present invention, the plurality of bright regions and the plurality of dark regions are dynamically displaced in the plurality of illuminating patterns in a first direction.

In an embodiment of the present invention, the illumination source is a plurality of pixels of a self-illuminating panel. The plurality of bright regions corresponds to one illuminated pixel of the self-illuminating panel. The plurality of dark regions corresponds to a plurality of consecutive unilluminated pixels of the self-illuminating panel.

In an embodiment of the present invention, a total number of one pixel of the self-illuminating panel illuminated in the first direction and the plurality of consecutive unilluminated pixels is equal to the number of the plurality of illuminating patterns sequentially provided by the illumination source during the one exposure period.

In an embodiment of the present invention, a switching frequency of the plurality of illuminating patterns is equal to a display refresh frequency.

In an embodiment of the present invention, the illumination source provides the plurality of illuminating patterns in cycles to illuminate the finger object during the one exposure period.

The fingerprint sensing method of the present invention includes the following steps: sequentially providing a plurality of illuminating patterns during one exposure period by an illumination source to sequentially illuminate a finger object placed on a transparent panel, where each of the plurality of illuminating patterns includes a plurality of bright regions and a plurality of dark regions arranged in sequence, the plurality of bright regions and the plurality of dark regions are dynamically displaced in the plurality of illuminating patterns; sensing the finger object illuminated by the plurality of illuminating patterns provided by the illumination source during the one exposure period to output a plurality of pixel data by a plurality of image sensing units of a fingerprint sensor; and receiving the plurality of pixel data by a processor, and generating a fingerprint image according to the plurality of pixel data.

In an embodiment of the present invention, each of the plurality of pixel data includes a fingerprint information parameter and a noise parameter. The fingerprint information parameter is a sum of a plurality of sub-fingerprint parameters. The noise parameter is a sum of sub-noise parameters. The number of the plurality of sub-fingerprint parameters and the number of the plurality of sub-noise parameters are equal to the number of the plurality of illuminating patterns.

In an embodiment of the present invention, a value of one of the plurality of sub-noise parameters is higher than a value of one of the plurality of corresponding sub-fingerprint parameters, and values of the plurality of other sub-noise parameters are respectively lower than values of the plurality of other corresponding sub-fingerprint parameters.

In an embodiment of the present invention, the plurality of bright regions and the plurality of dark regions are dynamically displaced in the plurality of illuminating patterns in a first direction.

In an embodiment of the present invention, the illumination source is a plurality of pixels of a self-illuminating panel. The plurality of bright regions corresponds to one illuminated pixel on the self-illuminating panel. The plurality of dark regions corresponds to a plurality of consecutive unilluminated pixels on the self-illuminating panel.

In an embodiment of the present invention, a total number of one pixel of the self-illuminating panel illuminated in the first direction and the plurality of consecutive unilluminated pixels is equal to the number of the plurality of illuminating patterns sequentially provided by the illumination source during the one exposure period.

In an embodiment of the present invention, a switching frequency of the plurality of illuminating patterns is equal to a display refresh frequency.

In an embodiment of the present invention, the illumination source provides the plurality of illuminating patterns in cycles to illuminate the finger object during the one exposure period.

Based on the above, according to the fingerprint sensing device and the fingerprint sensing method of the present invention, a finger object can be illuminated by sequentially providing a plurality of different illuminating patterns by an illumination source during one exposure period of an image capturing operation such that a fingerprint sensor obtains a fingerprint image with a high signal to noise ratio.

In order to make the aforementioned and other features and advantages of the present invention comprehensible, embodiments accompanied with figures are described in detail below.

DESCRIPTION OF THE EMBODIMENTS

Figure 1:
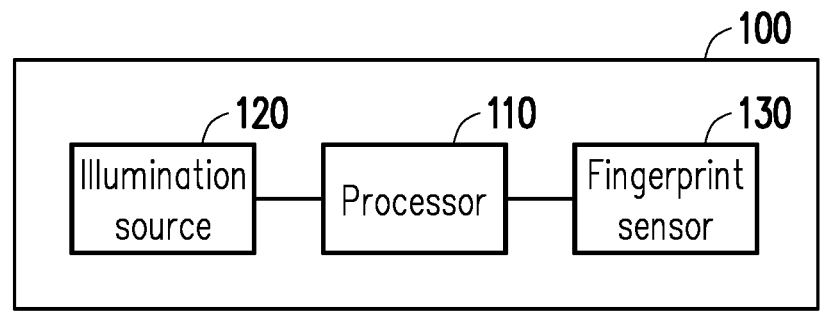
FIG. 1 is a functional block diagram of a fingerprint sensing device in accordance with an embodiment of the present invention.

In order to make the content of the present invention understood more easily, the following specific embodiments are examples of the present invention that can be implemented indeed. In addition, wherever possible, the components/members/steps using the same reference numerals in the drawings and the embodiments represent the same or similar parts.

FIG. 1 is a functional block diagram of a fingerprint sensing device in accordance with an embodiment of the present invention. Referring to FIG. 1, a fingerprint sensing device 100 includes a processor 110, an illumination source 120 and a fingerprint sensor 130. The fingerprint sensor 130 may include a plurality of image sensing units. The processor 110 is coupled to the illumination source 120 and the fingerprint sensor 130. In the present embodiment, when the fingerprint sensing device 100 performs a fingerprint sensing operation, the illumination source 120 is configured to sequentially provide a plurality of illuminating patterns during one exposure period to sequentially illuminate a finger object to be sensed. In the present embodiment, each of the plurality of illuminating patterns includes a plurality of bright regions and a plurality of dark regions arranged in sequence, and the plurality of bright regions and the plurality of dark regions have an effect of dynamic displacement change in the plurality of illuminating patterns. In the present embodiment, the plurality of image sensing units of the fingerprint sensor 130 senses the finger object illuminated by the plurality of illuminating patterns provided by the illumination source 120 during the one exposure period to output a plurality of pixel data to the processor 110. Therefore, the processor 110 may generate a fingerprint image according to the plurality of pixel data.

In the present embodiment, the fingerprint sensing device 100 may be integrated into a mobile phone, a tablet, a notebook, a desktop, or various portable electronic devices, and such electronic products capable of providing a fingerprint recognition function, the present invention is not limited thereto. In the present embodiment, the processor 110 may be a central processing unit (CPU), or other programmable general-purpose or special-purpose microprocessors, digital signal processors (DSP), programmable controllers, application specific integrated circuits (ASIC), programmable logic devices (PLD), other similar processors, or a combination of these processor circuits. The processor 110 may perform data operations on the pixel data provided by the fingerprint sensor 130 and generate a fingerprint image.

In the present embodiment, the plurality of image sensing units of the fingerprint sensor 120 may be, for example, charge coupled devices (CCD) or complementary metal-oxide semiconductor (CMOS) image sensors (CIS), which is not limited by the present invention. In addition, the fingerprint sensing device 100 of the present embodiment may further include a memory. The memory may be configured to store the pixel data and the fingerprint image captured by the fingerprint sensor 130, and store related image processing programs that may be used to implement the fingerprint recognition method in the various embodiments of the present invention for the processor 110 to read and execute the programs.

Figure 2:
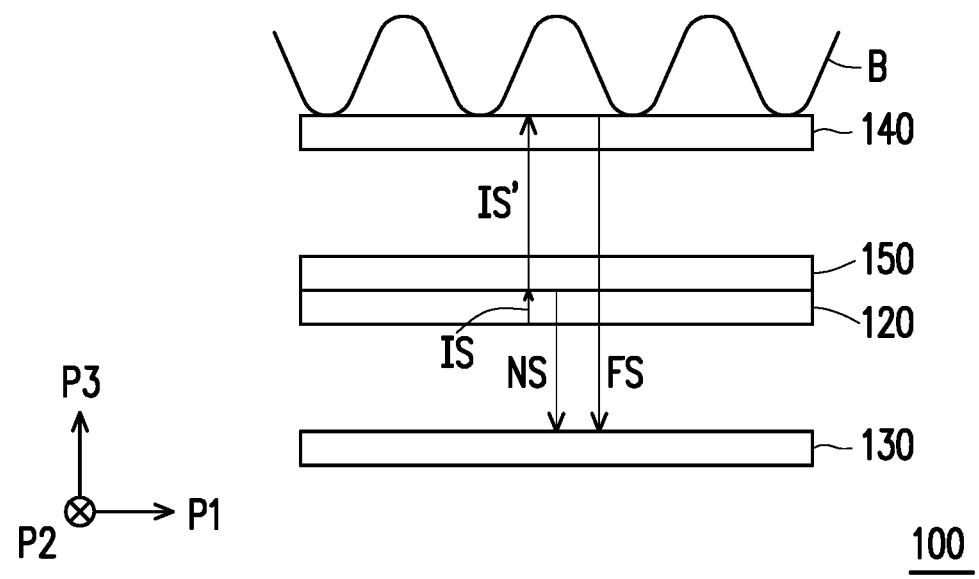
FIG. 2 is a schematic structural diagram of the fingerprint sensing device in accordance with the embodiment in FIG. 1 of the present invention.

FIG. 2 is a schematic structural diagram of a fingerprint sensing device in accordance with an embodiment of the present invention. Referring to FIG. 2, the fingerprint sensing device 100 may be, for example, an electronic device configured to apply an under-screen fingerprint recognition technology. Therefore, the fingerprint sensing device 100 may include an illumination source 120, a fingerprint sensor 130, a transparent panel 140, and a glass panel 150. It is to be noted that the illumination source 120, the transparent panel 140 and the glass panel 150 are mechanisms belonging to a display panel. In the present embodiment, the display panel may be, for example, an organic light emitting diode (OLED) display panel, a micro LED display panel, or a mini LED display panel, which is not limited by the present invention.

Taking the organic light emitting diode display panel as an example, the illumination source 120 may be a display panel including an organic light emitting diode pixel array. The transparent panel 140 may be a screen protection panel, and the glass panel 150 is combined with the display panel including the organic light emitting diode pixel array to conduct display light or illumination light provided by the illumination source 120 to the transparent panel 140. Further, when the electronic device applying the under-screen fingerprint recognition technology is operated in a display mode, the illumination source 120 is configured to provide display light to display an image picture via the transparent panel 140. However, when the electronic device applying the under-screen fingerprint recognition technology is operated in a fingerprint sensing mode, at least a portion of the illumination source 120 may be configured to provide illumination light to illuminate a finger object B placed or pressed on at least a portion of the transparent panel 140. Moreover, a switching frequency of the plurality of illuminating patterns provided by the illumination source 120 is equal to a display refresh rate. In addition, in an embodiment, the display panel may be, for example, a thin film transistor liquid crystal display (TFT LCD). Therefore, the illumination source 120 may be a back light, and the glass panel 150 may include a thin film transistor array.

Specifically, in the present embodiment, when the finger object B of a user is pressed on the transparent panel 140, the illumination source 120 may provide illumination light IS to the transparent panel 140, so that the transparent panel 140 reflects image light FS with fingerprint information to the fingerprint sensor 130. However, since the illumination light IS passes through the glass panel 150 first, the glass panel 150 will reflect a portion of the illumination light to noise light NS to be transmitted to the fingerprint sensor 130, and will transmit the other portion of the illumination light IS' to the transparent panel 140. In other words, the fingerprint sensor 130 collects a fingerprint information signal and a noise signal simultaneously in the process of capturing a fingerprint image.

Figure 3A:
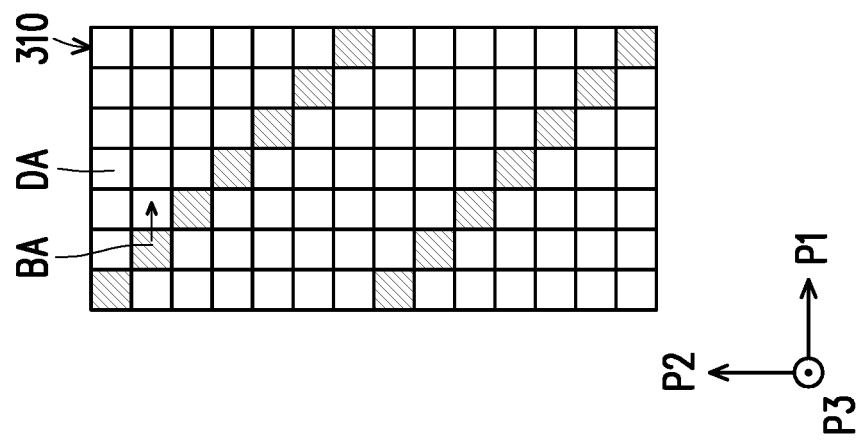
FIG. 3A to FIG. 3C respectively are schematic diagrams of an illuminating pattern in accordance with an embodiment of the present invention.
Figure 3B:
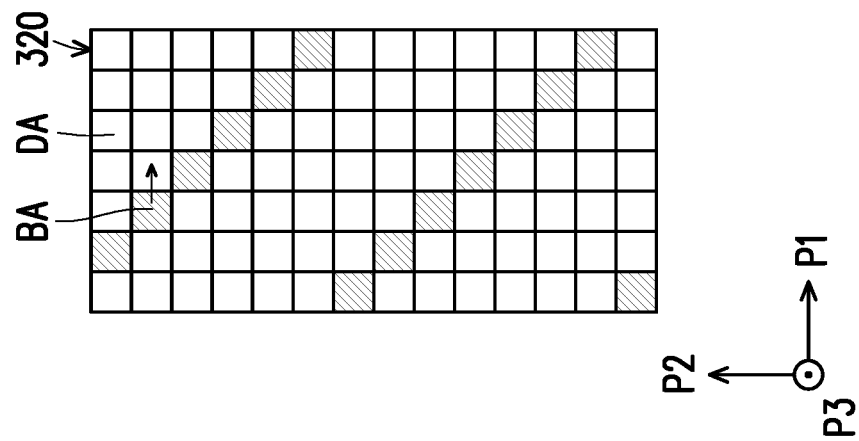
Figure 3C:
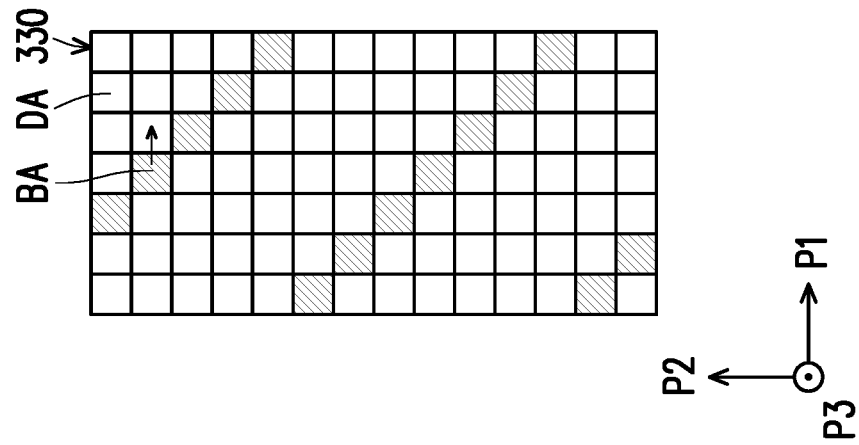

In this regard, in order to reduce the influence of the noise light NS, when the fingerprint sensing device 100 performs a fingerprint operation, the illumination source 120 of the present embodiment may sequentially provide illuminating patterns as shown in FIG. 3A to FIG. 3C during one exposure period. FIG. 3A to FIG. 3C respectively are schematic diagrams of an illuminating pattern in accordance with an embodiment of the present invention. Referring to FIG. 2 and FIG. 3A to FIG. 3C, since the illumination source 120 may be a self-illuminating panel and includes an illuminating pixel array, the illumination source 120 may illuminate only a portion of the pixels. In other words, each of the plurality of bright regions BA in FIG. 3A to FIG. 3C may respectively correspond to one illuminated pixel on the self-illuminating panel, and the plurality of dark regions DA may correspond to a plurality of consecutive unilluminated pixels on the self-illuminating panel. Moreover, as shown in FIG. 3A to FIG. 3C, the plurality of bright regions BA and the plurality of dark regions DA are dynamically displaced in the plurality of illuminating patterns 310 to 330 in a first direction P1, respectively.

It is to be noted that a total number of one pixel of the illumination source 120 illuminated in the first direction P1 and the plurality of consecutive unilluminated pixels is equal to the number of the plurality of illuminating patterns sequentially displayed by the illumination source 120 (providing illumination light) during the one exposure period. For example, in an illuminating pattern type of FIG. 3A to FIG. 3C, the illumination source 120 may sequentially display (provide illumination light) seven illuminating patterns during one exposure period. Therefore, each image sensing unit of the fingerprint sensor 130 may obtain a sub-fingerprint parameter and a sub-noise parameter sensed by illumination provided by a bright region during one exposure period, where a value of the sub-noise parameter is higher than a value of the sub-fingerprint parameter. Moreover, each image sensing unit of the fingerprint sensor 130 may also obtain a plurality of (e.g., six) sub-fingerprint parameters and a plurality of (e.g., six) sub-noise parameters sensed by illumination provided by a plurality of bright regions during one exposure period, where values of the sub-noise parameters are lower than values of the sub-fingerprint parameters. Moreover, the number (6+1=7) of the sub-fingerprint parameters is equal to the number of the illuminating patterns, and the number (6+1=7) of the sub-noise parameters is also equal to the number of the illuminating patterns.

Figure 4:
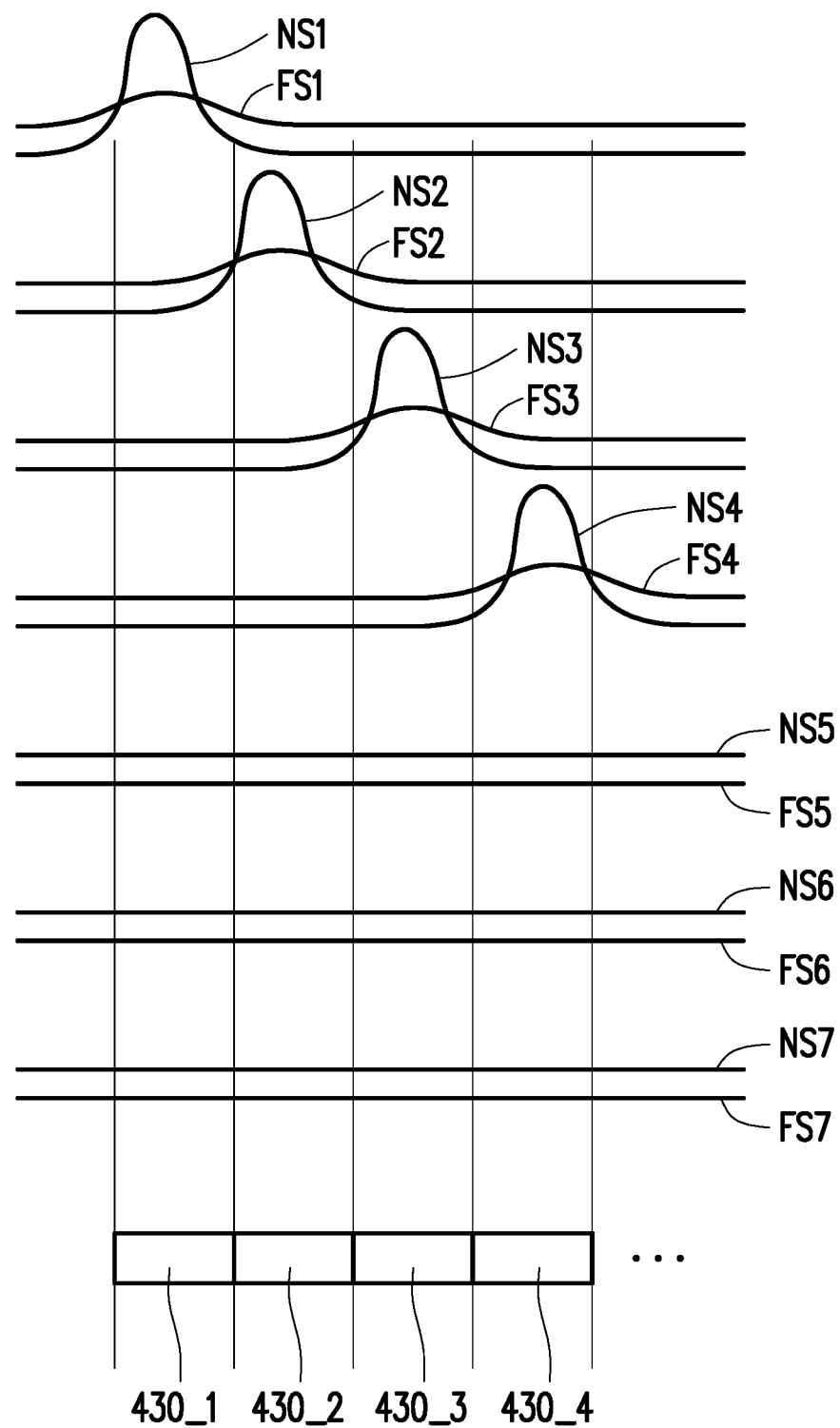
FIG. 4 is a signal intensity distribution diagram of fingerprint information and noise in accordance with an embodiment of the present invention.

FIG. 4 is a signal intensity distribution diagram of fingerprint information and noise in accordance with an embodiment of the present invention. Referring to FIG. 3A to FIG. 3C and FIG. 4, the illumination source of each embodiment of the present invention may include image sensing units 430_1 to 430_4 as shown in FIG. 4, but the number thereof is not limited to that shown in FIG. 4. In the present embodiment, first, when the illumination source displays the illuminating patterns as shown in FIG. 3A, the image sensing unit 430_1 may correspond to a bright region in a first grid of an upper left corner of the illuminating pattern 310 in FIG. 3A. The image sensing units 430_2 to 430_4 may correspond to dark regions in a second grid to a fourth grid of the upper left corner of the illuminating pattern 310 in FIG. 3A toward the first direction P1.

Then, when the illumination source displays the illuminating patterns as shown in FIG. 3B, the image sensing unit 430_1 may correspond to a dark region in a first grid of an upper left corner of the illuminating pattern 320 in FIG. 3B. The image sensing unit 430_2 may correspond to a bright region in a second grid of the upper left corner of the illuminating pattern 320 in FIG. 3B toward the first direction P1. The image sensing units 430_3 and 430_4 may correspond to dark regions in a third grid and a fourth grid of an upper left corner of the illuminating pattern 330 in FIG. 3C toward the first direction P1.

Then, when the illumination source displays the illuminating patterns as shown in FIG. 3C, the image sensing units 430_1 and 430_2 may correspond to dark regions in a first grid and a second grid of the upper left corner of the illuminating pattern 330 in FIG. 3C. The image sensing unit 430_3 may correspond to a bright region in a third grid of the upper left corner of the illuminating pattern 330 in FIG. 3C toward the first direction P1. The image sensing unit 430_4 may correspond to a dark region in a fourth grid of the upper left corner of the illuminating pattern 330 in FIG. 3C toward the first direction P1.

And so on, for the image sensing unit 430_1, when the illumination source sequentially displays seven illuminating patterns with a plurality of bright regions subjected to a dynamic displacement change as shown in FIG. 3A to FIG. 3C during one exposure period (from FIG. 3A to FIG. 3C, seven illuminating patterns are one cycle by analogy, one exposure period may include N cycles, where N must be a positive integer, and N=1 in this example.), the image sensing unit 430_1 may obtain sub-fingerprint image signals FS1 to FS7 and sub-noise signals NS1 to NS7 during one exposure period. Moreover, a switching frequency of the seven illuminating patterns is equal to a display refresh frequency of the illumination source. It is assumed that the image sensing unit 430_1 obtains a higher value of 3 after sensing the sub-fingerprint image signal FS1, and obtains seven lower values of 2 respectively after sensing the sub-fingerprint image signals FS2 to FS7. Moreover, the image sensing unit 430_1 obtains a higher value of 5 after sensing the sub-noise signal NS1, and obtains seven lower values of 0.1 respectively after sensing the sub-noise signals NS2 to NS7. Therefore, after the image integration, the fingerprint image parameter of the pixel data obtained by the image sensing unit 430_1 during the one exposure period may be, for example, 17 (3+2×7=17), and the noise parameter is, for example, 5.7 (5+0.1×7=5.7). Therefore, the signal to noise ratio thereof is 17/5.7. However, in the case of an illuminating pattern in which a bright region generally does not undergo a dynamic displacement change (the illuminating pattern includes all bright regions), the fingerprint image parameter of the pixel data obtained by the image sensing unit 430_1 during the one exposure period is, for example, 24 (3×8=24), and the noise parameter is, for example, 40 (5×8=40). Therefore, the signal to noise ratio thereof is 24/40. Accordingly, the fingerprint sensing device 100 of the present embodiment may obtain a fingerprint image with a higher signal to noise ratio.

Figure 5:
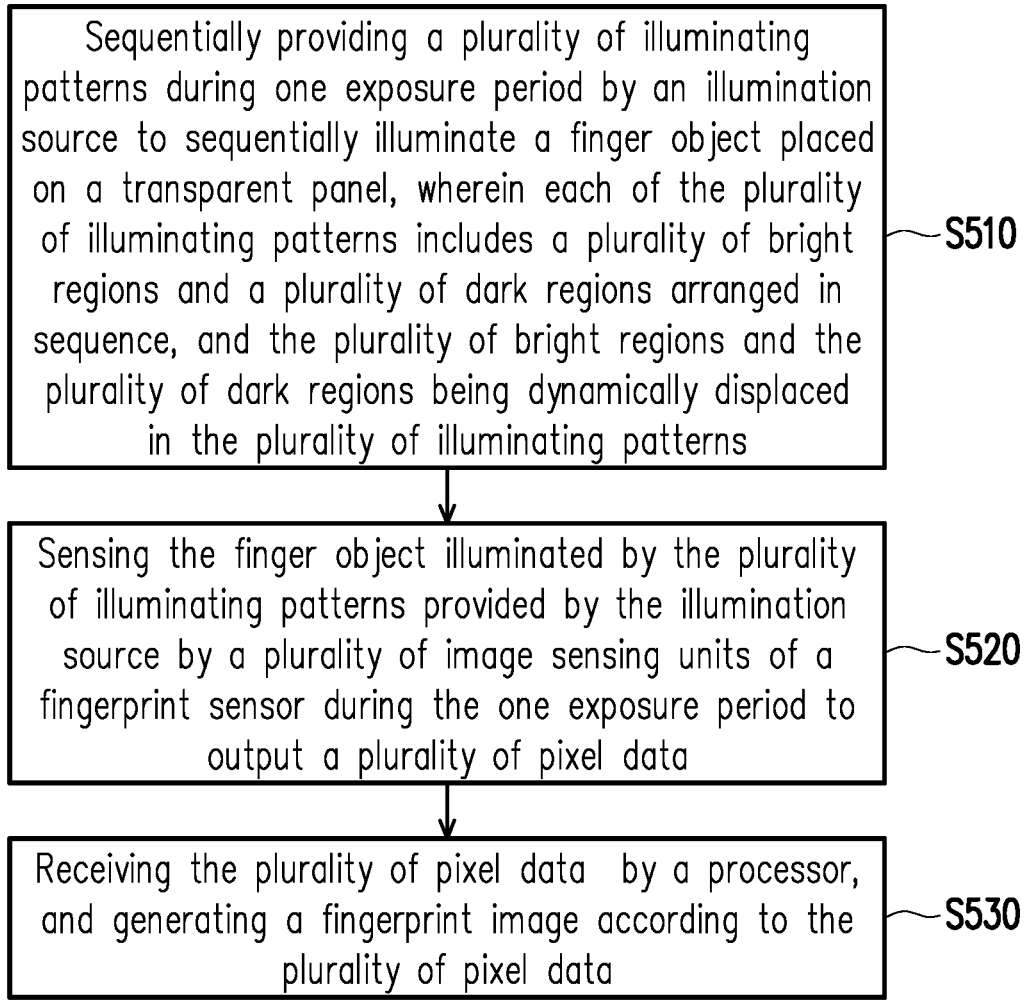
FIG. 5 is a flowchart of a fingerprint sensing method in accordance with an embodiment of the present invention.

FIG. 5 is a flowchart of a fingerprint sensing method in accordance with an embodiment of the present invention. Referring to FIG. 5, the fingerprint sensing method of the present embodiment is applicable to the fingerprint sensing device 100 of the embodiments of FIG. 1 and FIG. 2, so that the fingerprint sensing device 100 performs the following steps S510 to S530. In step S510, an illumination source 120 of a fingerprint sensing device 100 sequentially provides a plurality of illuminating patterns during one exposure period to sequentially illuminate a finger object B placed on a transparent panel 140, where each of the illuminating patterns includes a plurality of bright regions and a plurality of dark regions arranged in sequence, the bright regions and the dark regions are dynamically displaced in the illuminating patterns. In step S520, a plurality of image sensing units of a fingerprint sensor 130 of the fingerprint sensing device 100 senses the finger object B illuminated by the illuminating patterns sequentially provided by the illumination source 120 during the one exposure period to output a plurality of pixel data. In step S530, a processor 110 of the fingerprint sensing device 100 receives the pixel data and generates a fingerprint image according to the pixel data. Therefore, the fingerprint sensing method of the present embodiment enables the fingerprint sensing device 100 to effectively obtain a fingerprint image with a higher signal to noise ratio.

In addition, regarding other component features, implementation manners and technical details of the fingerprint sensing device 100 of the present embodiment, sufficient teaching, suggestion and implementation description can be obtained by referring to the description of the above-described embodiments of FIG. 1 to FIG. 4, and therefore the descriptions thereof are omitted.

Based on the foregoing, according to the fingerprint sensing device and the fingerprint sensing method of the present invention, a finger object can be illuminated by sequentially providing a plurality of different illuminating patterns by an illumination source during one exposure period of an image capturing operation, where each of the illuminating patterns includes a plurality of bright regions and a plurality of dark regions arranged in sequence, the bright regions and the dark regions are dynamically displaced in the illuminating patterns, such that a fingerprint sensor may obtain a higher fingerprint information parameter and a lower noise parameter after image integration. Accordingly, the fingerprint sensing device and the fingerprint sensing method of the present invention can generate a fingerprint image with a high signal to noise ratio.

Although the present invention has been disclosed with the foregoing embodiments, it is not intended to limit the present invention, and it is possible for any person of ordinary skill in the art to make some modifications and refinements without departing from the spirit and scope of the present invention. Therefore, the scope of protection of the present invention should be defined by the scope of the appended claims.

What is claimed is:

1. A fingerprint sensing device, comprising:
 a transparent panel;
 an illumination source, configured to sequentially provide a plurality of illuminating patterns during one exposure period to sequentially illuminate a finger object placed on the transparent panel;
 a fingerprint sensor, comprising a plurality of image sensing units, wherein the image sensing units sense the finger object illuminated by the illuminating patterns provided by the illumination source during the one exposure period to output a plurality of pixel data; and
 a processor, coupled to the illumination source and the fingerprint sensor, and configured to receive the pixel data to generate a fingerprint image according to the pixel data,
 wherein each of the illuminating patterns comprises a plurality of bright regions and a plurality of dark regions arranged in sequence, the bright regions and the dark regions are dynamically displaced in the illuminating patterns,
 wherein each of the pixel data comprises a fingerprint information parameter and a noise parameter, the fingerprint information parameter is a sum of a plurality of sub-fingerprint parameters, and the noise parameter is a sum of sub-noise parameters,
 the number of the sub-fingerprint parameters and the number of the sub-noise parameters are equal to the number of the illuminating patterns,
 wherein a value of one of the sub-noise parameters is higher than a value of one of the corresponding sub-fingerprint parameters, and values of the other sub-noise parameters are respectively lower than values of the other corresponding sub-fingerprint parameters.

2. The fingerprint sensing device according to claim 1, wherein the bright regions and the dark regions are dynamically displaced in the illuminating patterns in a first direction.

3. The fingerprint sensing device according to claim 2, wherein the illumination source is a plurality of pixels of a self-illuminating panel, the bright regions corresponding to one illuminated pixel of the self-illuminating panel, and the dark regions corresponding to a plurality of consecutive unilluminated pixels of the self-illuminating panel.

4. The fingerprint sensing device according to claim 3, wherein a total number of the one pixel of the self-illuminating panel illuminated in the first direction and the plurality of consecutive unilluminated pixels is equal to the number of the illuminating patterns sequentially provided by the illumination source during the one exposure period.

5. The fingerprint sensing device according to claim 1, wherein a switching frequency of the illuminating patterns is equal to a display refresh frequency.

6. The fingerprint sensing device according to claim 1, wherein the illumination source provides the illuminating patterns in cycles to illuminate the finger object during the one exposure period.

7. A fingerprint sensing method, comprising:

sequentially providing a plurality of illuminating patterns during one exposure period by an illumination source to sequentially illuminate a finger object placed on a transparent panel, wherein each of the illuminating patterns comprises a plurality of bright regions and a plurality of dark regions arranged in sequence, the bright regions and the dark regions are dynamically displaced in the illuminating patterns;

sensing the finger object illuminated by the illuminating patterns provided by the illumination source during the one exposure period to output a plurality of pixel data by a plurality of image sensing units of a fingerprint sensor; and receiving the pixel data by a processor, and generating a fingerprint image according to the pixel data, wherein each of the pixel data comprises a fingerprint information parameter and a noise parameter, the fingerprint information parameter is a sum of a plurality of sub-fingerprint parameters, and the noise parameter is a sum of sub-noise parameters, the number of the sub-fingerprint parameters and the number of the sub-noise parameters are equal to the number of the illuminating patterns, wherein a value of one of the sub-noise parameters is higher than a value of one of the corresponding sub-fingerprint parameters, and values of the other sub-noise parameters are respectively lower than values of the other corresponding sub-fingerprint parameters.

8. The fingerprint sensing method according to claim 7, wherein the bright regions and the dark regions are dynamically displaced in the illuminating patterns in a first direction.

9. The fingerprint sensing method according to claim 8, wherein the illumination source is a plurality of pixels of a self-illuminating panel, the bright regions corresponding to one illuminated pixel on the self-illuminating panel, and the dark regions corresponding to a plurality of consecutive unilluminated pixels on the self-illuminating panel.

10. The fingerprint sensing method according to claim 9, wherein a total number of the one pixel of the self-illuminating panel illuminated in the first direction and the plurality of consecutive unilluminated pixels is equal to the number of the illuminating patterns sequentially provided by the illumination source during the one exposure period.

11. The fingerprint sensing method according to claim 7, wherein a switching frequency of the illuminating patterns is equal to a display refresh frequency.

12. The fingerprint sensing method according to claim 7, wherein the illumination source provides the illuminating patterns in cycles to illuminate the finger object during the one exposure period.

* * * * *